US006643317B1

(12) United States Patent
Blumer

(10) Patent No.: US 6,643,317 B1
(45) Date of Patent: Nov. 4, 2003

(54) DIGITAL SPREAD SPECTRUM CIRCUIT

(75) Inventor: Marc Blumer, Belmont, CA (US)

(73) Assignee: Electronics for Imaging, Inc., Foster City, CA (US)

( * ) Notice: Subject to any disclaimer, the term of this patent is extended or adjusted under 35 U.S.C. 154(b) by 0 days.

(21) Appl. No.: 09/513,538

(22) Filed: Feb. 25, 2000

(51) Int. Cl.[7] .............................................. H04B 1/707
(52) U.S. Cl. ...................................... 375/130; 327/299
(58) Field of Search ................................ 375/130, 260, 375/285, 346, 362; 327/113, 114, 115, 119, 121, 124, 144, 145, 152, 153, 161, 165, 155, 182, 261, 263, 268, 270, 276, 283, 291, 299

(56) References Cited

U.S. PATENT DOCUMENTS

| 4,914,674 | A |   | 4/1990  | Kimber et al. ................. 375/1   |
|-----------|---|---|---------|----------------------------------------|
| 4,961,203 | A |   | 10/1990 | Maufe et al. ................... 375/1  |
| 5,426,392 | A | * | 6/1995  | Kornfeld ...................... 327/551 |
| 5,483,185 | A | * | 1/1996  | Scriber et al. ................. 327/99 |
| 5,488,627 | A | * | 1/1996  | Hardin et al. ................. 375/139 |
| 5,610,955 | A |   | 3/1997  | Bland .......................... 375/376 |
| 5,631,920 | A |   | 5/1997  | Hardin ......................... 375/200 |
| 5,647,379 | A |   | 7/1997  | Meltzer ........................ 128/897 |
| 5,659,587 | A |   | 8/1997  | Knierim ........................ 375/376 |
| 5,736,893 | A | * | 4/1998  | Puckette et al. ............. 327/551   |
| 5,757,338 | A |   | 5/1998  | Bassetti et al. ................. 345/3 |
| 5,781,074 | A |   | 7/1998  | Nguyen et al. ............. 331/105     |
| 5,867,524 | A | * | 2/1999  | Booth et al. ................. 375/130  |
| 5,926,053 | A | * | 7/1999  | McDermott et al. ........ 327/298       |
| 6,144,242 | A | * | 11/2000 | Jeong et al. ................. 327/269  |
| 6,167,103 | A | * | 12/2000 | Hardin ......................... 375/376 |
| 6,240,123 | B1| * | 5/2001  | Zhang et al. ................ 375/130   |
| 6,473,455 | B1| * | 10/2002 | Kwon ......................... 375/228   |

FOREIGN PATENT DOCUMENTS

| EP | 0194826 | 9/1986 | ............ H04B/1/66 |
| EP | 0195573 | 9/1986 | ............ H04B/1/66 |
| EP | 0713714 | 5/1996 | ............ A61N/1/37 |

* cited by examiner

Primary Examiner—Chi Pham
Assistant Examiner—Khanhcong Tran

(57) ABSTRACT

A digital spread spectrum system provides a simple, digital device and method for reducing electromagnetic interference even where a clock signal to the device is rapidly turned on and off. A primary clock signal drives a signal selector. A signal delay is provided in the circuit to provide delayed clock pulse signals. The signal delay detunes the primary clock signal. By repeatedly switching the delay in and out of the clock signal path, a first signal is generated having a frequency at or about the clock signal, and, a second signal is generated which is displaced slightly from the first signal, but still at or about the clock frequency. By repeatedly switching the delay in and out of the primary clock signal path at a rate greater than the frequency of the clock signal, smaller portions of each primary clock pulse may be parsed for subsequent reaggregation to create a spread spectrum clock signal. As a result, a plurality of spread spectrum clock signals at varying frequencies may be created to spread the energy of the signal over a broader spectrum, thereby lowering the signal energy peak to minimize radiation of electromagnetic emissions at undesirable levels.

17 Claims, 7 Drawing Sheets

DIGITAL SPREAD SPECTRUM CIRCUIT

BACKGROUND OF THE INVENTION

TECHNICAL FIELD

This invention relates to electronic circuitry for reducing emissions of electromagnetic interference. More particularly, the invention relates to such circuitry using digital spread spectrum means.

DESCRIPTION OF THE PRIOR ART

Many electronic devices employ microprocessors or other digital circuits that require one or more clock signals for synchronization. A clock signal permits the precise timing of events in the microprocessor. Typical microprocessors may be supervised or synchronized by a free-running oscillator, such as driven by a crystal, an LC-tuned circuit, or an external clock source.

High performance, microprocessor-based devices using leading edge, high-speed circuits are particularly susceptible to generating and radiating electromagnetic interference (EMI). Undesirable EMI is generated when a clock electronic circuit produces a pulsed signal having a pronounced energy peak, including at harmonic frequencies. The spectral components of the EMI emissions typically have peak amplitudes at harmonics of the fundamental frequency of the clock circuit. These high-power harmonic electromagnetic pulses can interfere with other carrier signals at higher frequencies, such as radio waves. Accordingly, many regulatory agencies, such as the Federal Communications Commission in the United States, have established testing procedures and maximum allowable electromagnetic emissions levels for such devices.

To comply with such government limits on EMI emissions, costly suppression measures or extensive shielding have been used. Other approaches for reducing EMI have included careful routing of signal traces on printed circuit boards to minimize loops and other potentially radiating structures. Unfortunately, such an approach often leads to more expensive multi-layer circuit boards with internal ground planes. In addition, greater engineering effort must go into reducing EMI emissions.

It is also known to lower the pronounced energy peak and still accomplish the desired clock function by using spread spectrum techniques that modulate the clock slowly to spread the energy of the of the signal over a broader portion of the spectrum about either side of the original peak.

Several spread spectrum modulation techniques have been employed in the past in an attempt to minimize the emission of magnetic interference from electronic devices, including printers. Many of the latest spread spectrum modulation techniques employ a phase-locked loop (PLL) in conjunction with a voltage-controlled oscillator (VCO). PLL-based spread spectrum systems rely on analog modulation methods and do not operate reliably when the fundamental clock input to the system is rapidly turned on and off. A separate waveform having a specific profile is overlaid on the waveform of the clock generator, causing a frequency shift during the generation of each clock pulse. A PLL-based system can fail to adequately reduce EMI if the modulated frequency is changed too slowly. Further, PLL-based modulator frequency output can drift due to comparator phase delays, resulting in system jitter and failing to provide a modulated signal with sufficient quality to control or synchronize other elements of the dependent microprocessor or digital circuit.

Following is a review of several relevant spread spectrum modulation techniques found in the prior art.

Hardin et al, Spread Spectrum Clock Generator And Associated Method, U.S. Pat. No. 5,488,627 (Jan. 30, 1996) provides a slight variation on the aforementioned PLL-based spread spectrum modulator systems. In Hardin's system, an analog method is used to sweep up and down the reference clock signal frequency to provide the desired modulation. Hardin's method likewise employs a PLL as part of its circuitry. In another patent, Hardin, Spread Spectrum Clock Generator, U.S. Pat. No. 5,631,920 (May 20, 1997), describes another PLL-based spread spectrum modulation approach which is to similar to Hardin's earlier patent, but simply uses a different analog method to sweep up and down the reference clock signal frequency.

Puckette et al, Digital Method And Apparatus For Reducing EMI Emissions In Digitally Clocked Systems, U. S. Pat. No. 5,736,893 (Apr. 7, 1998) describes a complex spread spectrum signal modulation system requiring at least one PLL to regenerate the needed frequencies to modulate the clock signal. In a system requiring rapid initialization, Puckette's system would not operate effectively due to the delays associated with ramp-up and synchronization between the input clock signal and the associated reference signal.

Another PLL-based system, Bassetti et al, EMI Reduction For A Flat-panel Display Controller Using Horizontal-line Based Spread Spectrum, U. S. Pat. No. 5,757,338 (May 26, 1998) is directed to a spread spectrum modulator for driving a flat panel display and CRT. In Bassetti's system, the primary purpose is to minimize distortion of displayed images when both a CRT and a flat panel display are used concurrently and in close proximity. A horizontal clock counter is used to modulate the primary reference clock frequency in conjunction with analog components, including digital to analog converters and a voltage-controlled oscillator (VCO). Bassetti's is complex and difficult to adjust for application to varying types of devices other than CRT's and flat panel displays.

Knierim, Spread Spectrum Phase-locked Loop Clock Generator With VCO Driven By A Symmetrical Voltage Ramp Signal, U.S. Pat. No. 5,659,587 (Aug. 19, 1997) teaches a similar spread spectrum modulation system dependent upon an analog VCO and PLL. Bland, Circuit For Generating A Spread Spectrum Clock, U.S. Pat. No. 5,610,955 (Mar. 11, 1997) also teaches an analog VCO-based clock modulator.

Each of the above systems include inherent PLL-based delays which would preclude their use in systems, such as printers, where the primary input clock is repeatedly turned on and off.

Accordingly, a need exists for a simple yet effective electronic apparatus to reduce emissions of electromagnetic interference from microcircuits using clock pulses to regulate their operation. Additionally, a need exists for such an apparatus that is capable of operating during rapid initialization and shutdown of the microcircuit, such as that used in laser printers.

SUMMARY OF THE INVENTION

The invention provides a simple, flexible, and inexpensive device and method for reducing emissions of electromagnetic interference through the use of a novel electronic circuit. Further, the invention provides such a circuit that is operable even where the clock signal to the device is rapidly turned on and off. The spread spectrum system generates the spread spectrum output clock signal by parsing, sampling, delaying, and reaggregating the various frequency components of the original clock signal. The digital modulation, or spread spectrum simulation, reduces the spectral amplitude of the EMI components at each harmonic of the clock when compared to the spectrum of the same clocking signal without such digital modulation.

In a most basic configuration, the electronic circuit of the invention employs a primary non-modulated clock signal which acts as both the source of the output digitally modulated clock signal and also drives a standard flip-flop. The flip-flop actuates an MOS circuit that controls either the operation of a Resistor-Capacitor ("RC") timing circuit or delay line. The RC timing circuit or delay line detunes the clock signal from the desired nominal frequency. By selecting first the non-modulated clock signal and then the delayed signal, a first signal is generated having a frequency at the clock signal, and, a second signal is generated which is displaced slightly from the first signal, but still at the clock frequency. When aggregated, a digitally modulated output signal is produced. Detuning of the clock signal allows the energy of the clock signal to be sufficiently spread over a broader frequency band to reduce the EMI at the primary clock frequency, while still providing desired clock function at the desired nominal frequency for synchronization of various elements of the microcircuit. By repeatedly switching the RC circuit or delay line in and out of the non-modulated clock signal path, a variety of samples of the non-modulated clock signal may be obtained and later aggregated to provide an output clock signal having an approximately equivalent nominal frequency, yet lacking the high energy harmonic pulses which would violate EMI restrictions.

A more scalable preferred embodiment of the invention includes a waveform or clock signal generation means, such as an oscillator, that drives an n input multiplexer, either directly, or, through n−1 delay lines. As a result, multiple clock signals at varying frequencies may be created to spread the energy of the clock signal over a broader spectrum. Thus, the electromagnetic energy of the clock signal is spread on either side of its original energy peak, thus producing a modulated output clock signal. The modulated output clock signal has a lowered energy peak but retains a nominal frequency equivalent to that of the fundamental frequency of the primary clock signal. Consequently, the circuit being driven, regulated, synchronized or otherwise managed by the modulated clock signal still operates reliably. Hence, by lowering the output signal energy peak at the fundamental frequency and harmonics of that frequency, the individual electronic device is able to meet proscribed FCC regulations.

The invention particularly lends itself to uses, such as in a high-speed laser printer engine, where it is desirable to have the electronic device quickly, and repeatedly, initialize and shutdown. Conventional PLL-based spread spectrum modulators are incapable of performing in a system having such instantaneous start and stop requirements. The invention eliminates the need for the modulation circuit to reach a stable state or ramp up, as required with a PLL-based modulator. Consequently, systems which use the spread spectrum system of the present invention are able to respond more efficiently to changing operating conditions without exceeding EMI restrictions.

DETAILED DESCRIPTION OF THE INVENTION

Figure 1:
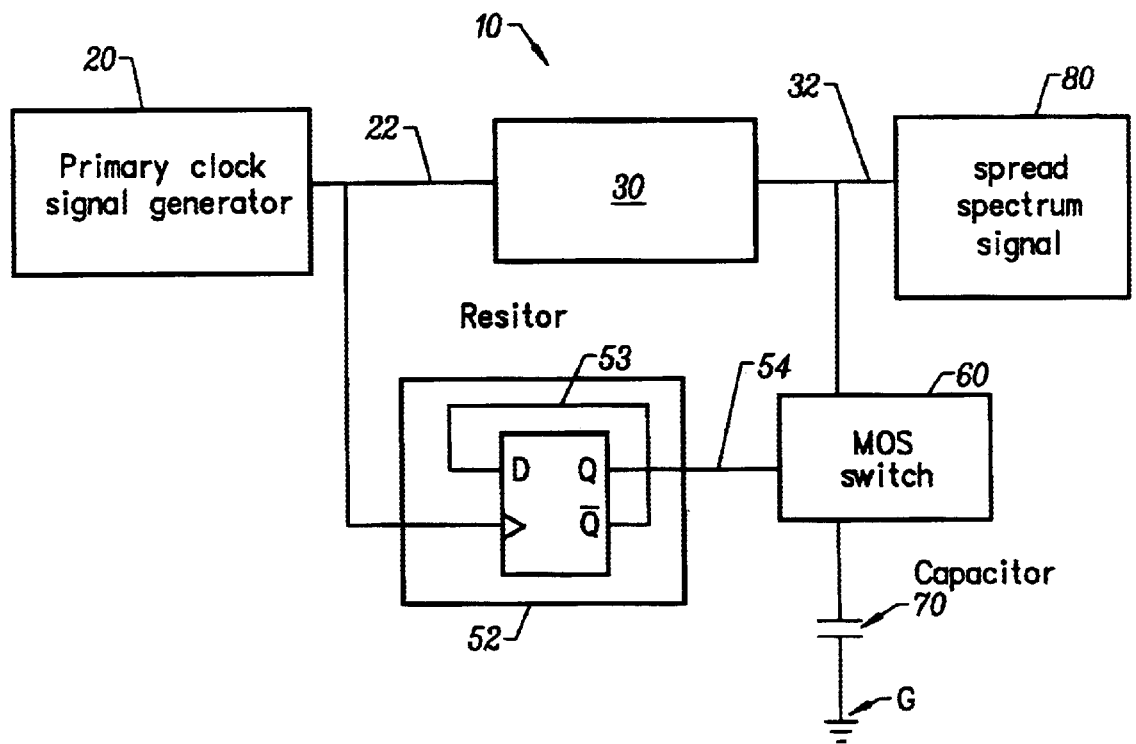
FIG. 1 is a circuit diagram of a basic embodiment of the invention using an RC timing circuit.

Referring to the drawings wherein like reference numerals represent like parts throughout the various drawing figures, reference numeral 10 identifies to a basic embodiment of a digital spread spectrum system according to the invention. FIG. 1 provides a basic block diagram of a first embodiment 10 of the circuit components of the invention. A resistor-capacitor timing circuit 30 and 70 provides one form of a means to detune the primary clock signal 22 off its primary frequency.

In essence, and with initial reference to FIG. 1, in a first basic circuitry embodiment 10, the invention provides a system and method for digitally spreading a primary clock signal 22 over a broader bandwidth to reduce EMI emissions at the clock fundamental frequency and resulting harmonics of the clock fundamental frequency. The spread spectrum system 10 employs a primary clock signal generator 20 to generate a non-modulated primary clock signal 22 which serves as the source for an output digitally-modulated clock signal 80, hereinafter identified as a spread spectrum signal 80. A delay means 30 with 70, in this case a resistor-capacitor timing circuit, receives the primary clock signal 22. The signal 32 is delayed when the MOS switch 60 is turned on effectively connecting the capacitor 70 to the resistor 30 or not delayed when the MOS switch 60 is turned off isolating the capacitor 70 from the resistor 30. The primary clock signal 22 is routed through a frequency divider 52, which outputs signal 54 at half the primary clock frequency 20. The divider 54 actuates an NMOS switch 60 that connects or isolates the capacitor 70 from the resistor 30. Although shown in this first embodiment 10 as a timing delay circuit 30 and 70, the delay means—may be an RC circuit 30 and 70, a delay line 131 (FIG. 2a) or some other similar device or circuit capable of selecting and delaying transmission of an inputted signal. The RC circuit 30 and 70 (FIG. 1) and delay line 131 (FIG. 2a) both provide a means to detune the primary clock signal 22 from its primary nominal frequency. By repeatedly switching the capacitor 70 circuit (FIG. 1) in and out of the signal path 32, or delay line 131 (FIG. 2a) in and out of the primary clock signal 22 path, two differently timed signals may be generated.

Referring once again to FIG. 1, a first non-delayed signal 32 is generated having a frequency at the primary clock signal 22, and, a second delayed signal 32 is generated which is displaced slightly from the frequency of the first signal 62, but still at the frequency of the primary clock signal 22. De-tuning the primary clock signal 22 allows the energy of each pulse of the primary clock signal 22 to be sufficiently spread over a broader frequency band to reduce the EMI at the primary clock signal. 22 fundamental frequency, while still providing desired clock function at a desired nominal clock frequency. For the purposes of this description, the nominal clock frequency is that frequency resulting from the re-aggregation of a plurality of parsed spectral components of a primary clock signal 22 to form a new spread spectrum clock signal 80 having different pulse amplitude and spectral spreading. Generally, the nominal frequency is sufficiently similar to the fundamental frequency of the primary clock signal 22 that the devices being controlled or synchronized by the system clock 20 still operate correctly when driven by a spread spectrum signal 80 having such a nominal frequency. The generated nominal frequency has a lower spectral amplitude than the fundamental frequency of the primary clock signal 22 due to the spectral spreading of the primary clock signal 22.

More particularly, and with specific reference to FIG. 1, a first embodiment of the system 10 using a resistor-capacitor (RC) timing circuit is described. A clock generating means 20 produces a non-modulated clock signal 22. The clock generating means 20 may include a voltage-controlled oscillator (VCO), a piezoelectric crystal or other such similar components capable of producing a series of regular and stable clock pulses at a frequency used to drive and synchronize other elements of a microcircuit-based device. For purposes of explaining the operation of the invention, the primary clock signal 22 is presumed to have a frequency of 66 MHz, which corresponds to the operational frequency of many of today's popular microprocessors. However, one skilled in the art will recognize that the invention may be used to digitally spread any clock signal 22 at any frequency. Digital system boards currently operate at speeds in excess of 100 MHz. The invention is readily adaptable to such high speed and future higher speed devices that may be developed.

As shown in FIG. 1, in a first embodiment 10 of the invention, the primary non-delayed clock signal 22 may be first routed through a frequency divider 52. For purposes of this example, the frequency divider 52 is shown as a divide-by-two frequency divider 52. However, other frequency dividers or finite state machines may be used to accommodate differing digital circuit applications. In this example, the frequency divider 52 divides an originating 66 MHz clock signal 22 to generate a divided 33 MHz clock signal 53. The 33 MHz clock signal 53 drives a divide-by-two flip-flop 54. The flip-flop 54 in turn drives an NMOS switch 60. The NMOS switch 60 regulates connection of the capacitor.

By driving the flip-flop 54 at half the frequency, the NMOS switch 60 is caused to alternate every other clock period between the non-delayed clock signal 32 and the delayed clock signal at a rate parsing one pulse into two spectral components. Concurrently, the parsed pulses may then be reaggregated to create a digitally spread output clock signal pulse, resulting in a spread spectrum signal 80. The period of each digitally spread clock signal pulse is alternatively longer or shorter than that of the original dock pulse. The length of the spread pulse is determined by the delay time D of the RC timing circuit 30. The length of the signal delay D is controlled by the operating characteristics of the selected Resistor circuit 30 and the capacitance of the capacitor 70.

Again, by driving the flip-flop 54, and hence, the NMOS switch 60 at half the clock frequency of the primary clock signal 22 frequency, the described spread spectrum system 10 generates a spread spectrum output pulse signal 80 composed of portions of the original clock pulse and portions of the original clock pulse delayed by the amount of delay time D inherent within the RC timing circuit 30 and 70. The period T of the pulse is expanded or contracted by the amount of delay time D inherent within the AC timing circuit 30, while the total energy of the pulse remains substantially constant. Consequently, having spread the energy of a single clock pulse over a period of T+D and T−D, while the total pulse energy remains constant, the amplitude of the outputted spread spectrum pulse is lower at both the nominal frequency and harmonics of that frequency. Hence, by varying the delay time D of the RC timing circuit 30 and 70 the spread in frequency of signal 80 can be adjusted with infinite granularity. The generated spread spectrum clock signal 80 provides desired system synchronization via generation of a specific nominal frequency while minimizing radiation of undesirable EMI.

Figure 2A:
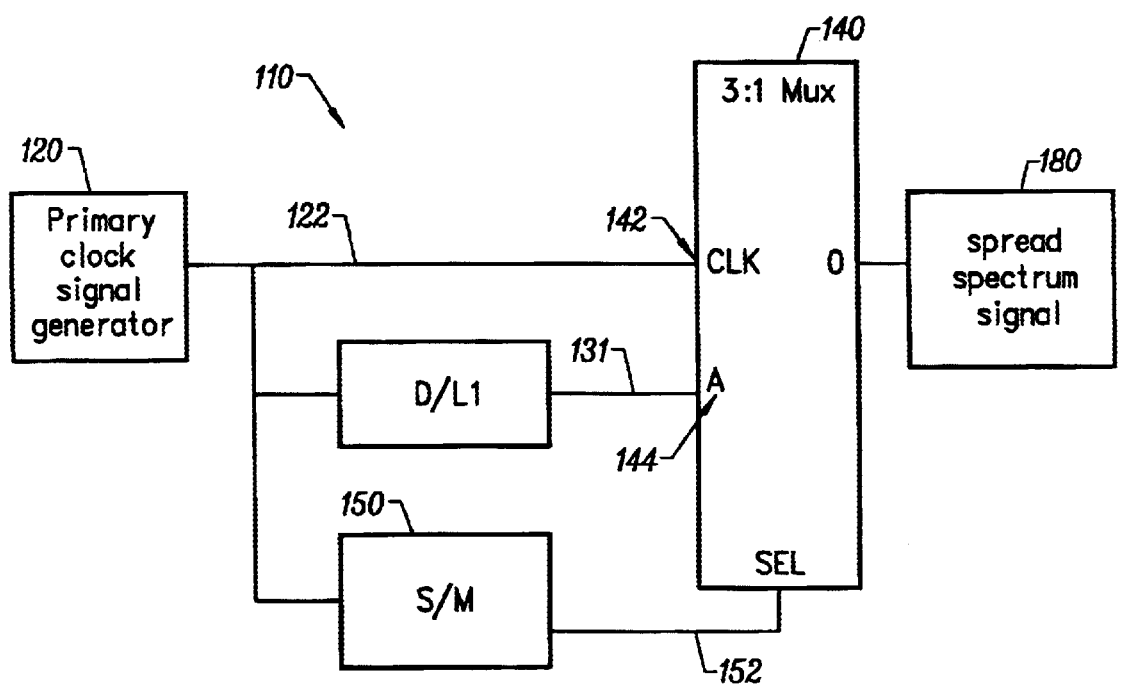
FIG. 2a is a block diagram of the spread spectrum circuit having only one delay line according to the invention.

Referring now to FIG. 2a, a second embodiment 110 of the spread spectrum system is described. The second embodiment 110 replaces the switched capacitor timing circuit 30 and 70 (FIG. 1) with a static RC or chip-level delay line to provide a means to delay the primary clock signal 122. In this second embodiment 110, a single delay line having a delay time of D/L1 receives an input of the primary clock signal 122. The spread spectrum system 110 may select from either the original non-delayed clock input signal 122 or the delayed signal 131. Both a clean line carrying the original reference clock signal 122 and the delay line carrying the detuned clock signal 131 are routed to a two-to-one multiplexer 140. The two-to-one multiplexer includes a primary input pin to receive the primary clock signal 122 and a first input pin A 144 to receive the delayed clock signal from the first delay line.

Figure 2B:
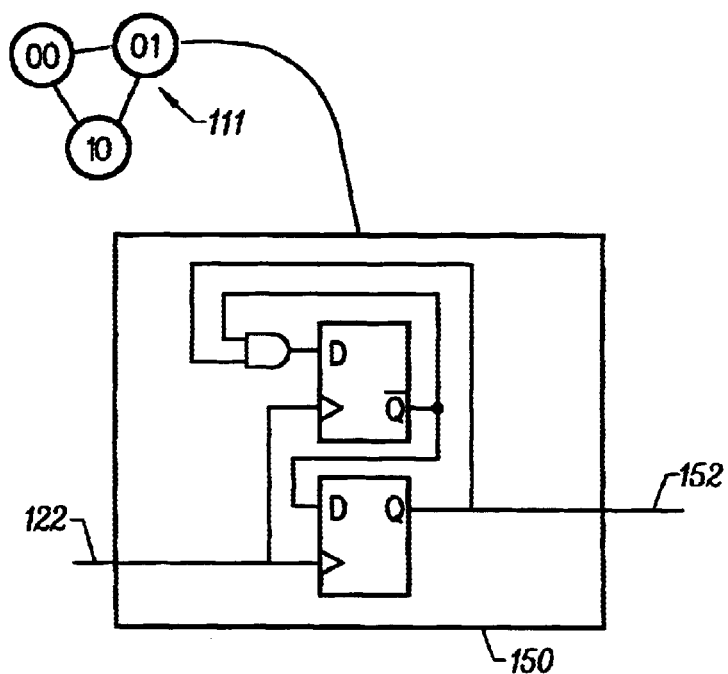
FIG. 2b is a block diagram of the state machine from FIG. 2a selecting the different inputs to the multiplexer.
Figure 3:
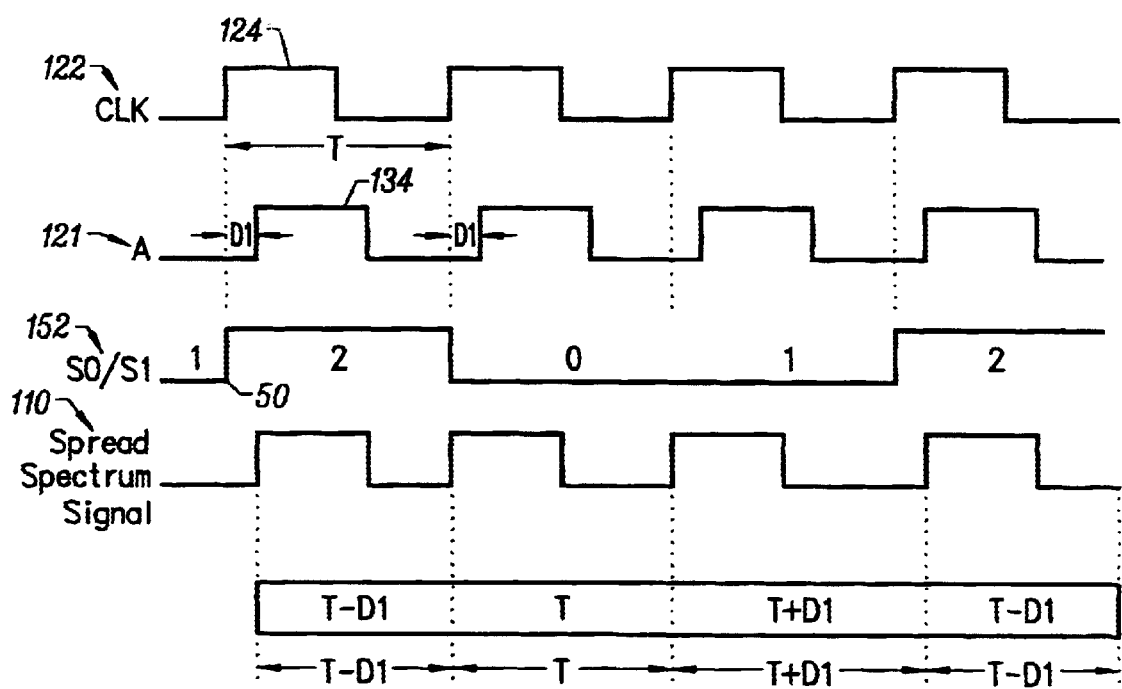
FIG. 3 is a timing diagram providing a discrete snapshot of the operation of the basic spread spectrum circuit having only one delay line according to the invention.

A state machine 150 receives an input from the original primary clock signal 122 which synchronizes operation of the state machine 150 with operation of the multiplexer 140. In this second embodiment 110, the state machine 150 generates three states 111 (FIG. 2b) sequentially inputted to the multiplexer 140 via a line 152. FIG. 2b is a block diagram of the state machine from FIG. 2a selecting the different inputs to the multiplexer Referring now to both FIGS. 2a and 3, the timing diagram provided in FIG. 3 illustrates the discreet operation of the single delay line embodiment 110 of the spread spectrum system according to the invention. The timing diagram shows the original non-delayed clock signal 122 and the delayed clock signal 131 as each having equal periods of 1. The delay line 130 has an inherent delay time of D/L1. When flip-flop 140 of the 2-bit state machine 150 is low, it issues a low signal 152 on the SEL pin which causes the multiplexer 140 to select and output the non-delayed signal 122 present at the primary clock signal input pin CLK 142. When flip-flop 140 of the 2 bit state machine 150 is high, it issues a high signal 152 on the SEL pin which causes the multiplexer 140 to select and output the delayed signal 131 present at the delay line input pin A 144.

The state machine 150 and multiplexer 140 cooperate to parse, sample, and reaggregate the original clock signal 122 and delayed signal 131 to provide an output spread spectrum clock signal 180 whose period switches alternatively between T, T+DL1, T−DL1 decreasing the peak energy at the main frequency of f=1/T of the primary clock signal. The total energy is effectively spread to three frequencies at f1=1/T, f2=1/(T+DL1) and f3=1/(T−DL1).

Thus, depending on the input original clock signal 122, the delay time D/L1 inherent in the delay line 130, the selection of the multiplexer 140 input by the state machine 150, one is able to design a spread spectrum system circuit configuration according to the invention that is capable of generating a plurality of different aggregate output spread spectrum clock signals 180.

In an alternative preferred embodiment 210 according to the invention (FIG. 4), two delay lines 230, 232 are provided having inherent delay times of D1 and D2, respectively. For simplicity of description, the delay time of the first delay line 230 is D1; the delay time, D2, of the second delay line 232 is two times the delay time of first delay tine 230. Hence, D2 is equal to D1+D1.

Figure 4:
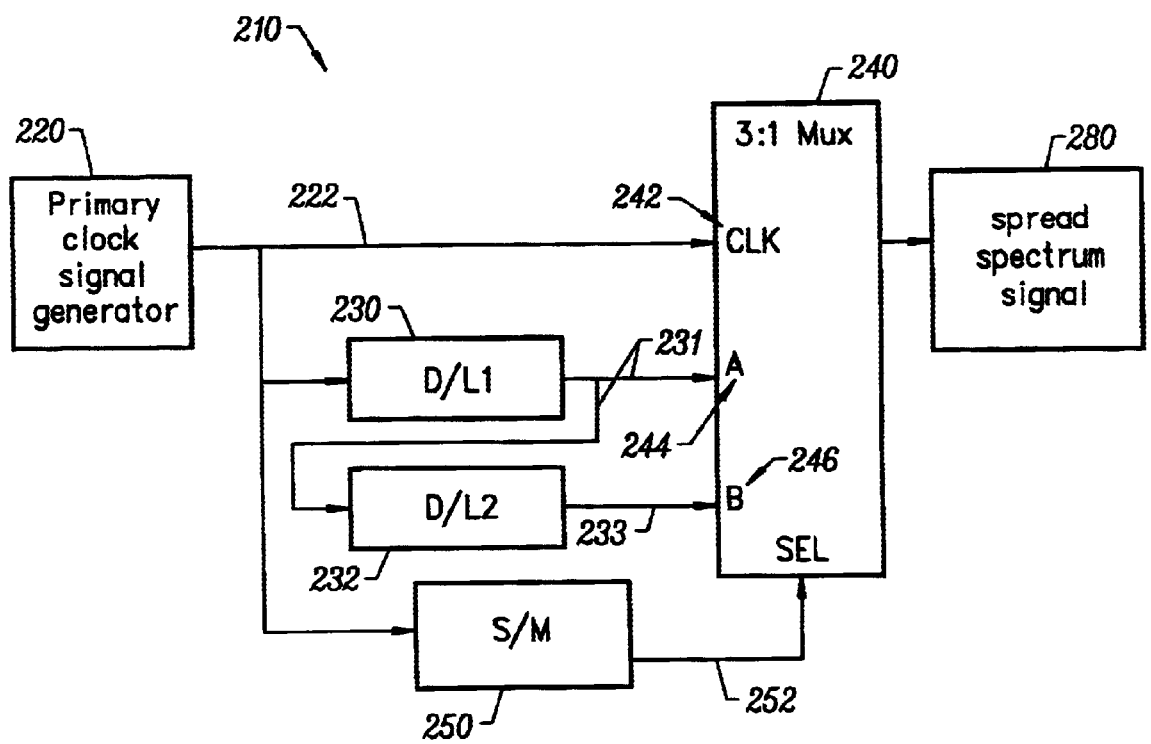
FIG. 4 is a block diagram of a preferred embodiment of the spread spectrum circuit having two delay lines according to the invention.

However, as shown in FIG. 4, the output of the first delay line 230 is routed to both the multiplexer 240 and the second delay line 232. Consequently, the actual delay time of the second delay line 232 is a sum of the delay time D1 inherent in the first delay tine 232 and the delay time D2 in the second delay line 232. Thus, a signal outputted from the second delay line 232 in this preferred embodiment 210 of the invention is actually delayed by 3*D1. This particular delay line combination is but one of a plurality of different delay line configurations contemplated by the invention which may be modified to generate a plethora of differing outputted spread spectrum signals 280.

Figure 5:
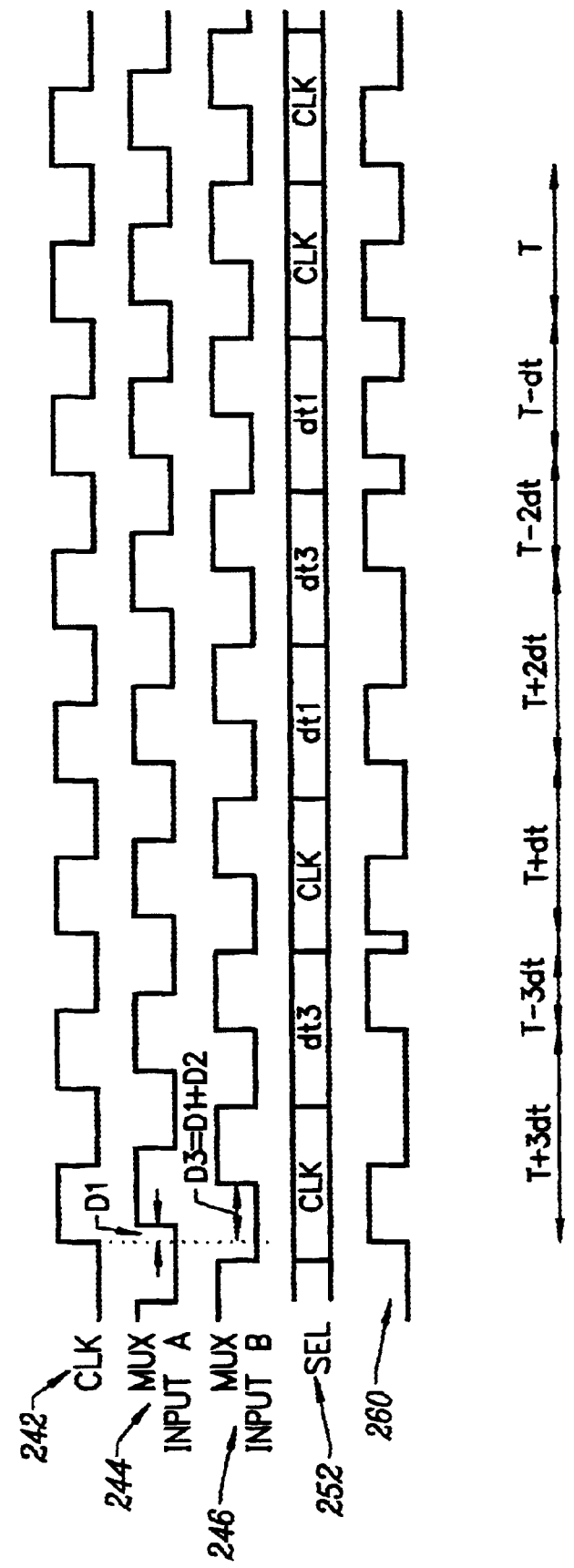
FIG. 5 is a timing diagram providing a discrete snapshot of the operation of the alternative embodiment of the spread spectrum circuit having two delay lines according to the invention.

This dual delay line embodiment 210 of the spread spectrum system is thus capable of generating three signals: the original non-delayed clock signal 222, the D1 clock signal 231, and the D3 clock signal 233. Each clock signal 222, 231, 233 is routed to separate input pins 242, 244, 246 of a 3 to 1 multiplexer 240. The multiplexer 240 is then able to sample each of the three signals 222, 231, 233. Accordingly, viewing the discreet operation of the dual delay line spread spectrum, the original non-delayed clock signal 222 is parsed, sampled, and reaggregated to provide an output spread spectrum signal 280 having a period of T+D1+D2 or T+3*D1. Consequently, the period of the outputted spread spectrum signal 180 is lengthened or reduced while the total energy of the signal remains constant. Accordingly, the amplitude of the signal at all frequencies is substantially lowered, thereby reducing the level of EMI produced at the nominal frequency and all harmonics thereof during the generation of the signal. The timing diagram associated with the discreet operation of this preferred embodiment is provided in FIG. 5 to illustrate how the addition of one more delay line substantially increases the number of possible configurations for the resulting spread spectrum signal 280.

Figure 6:
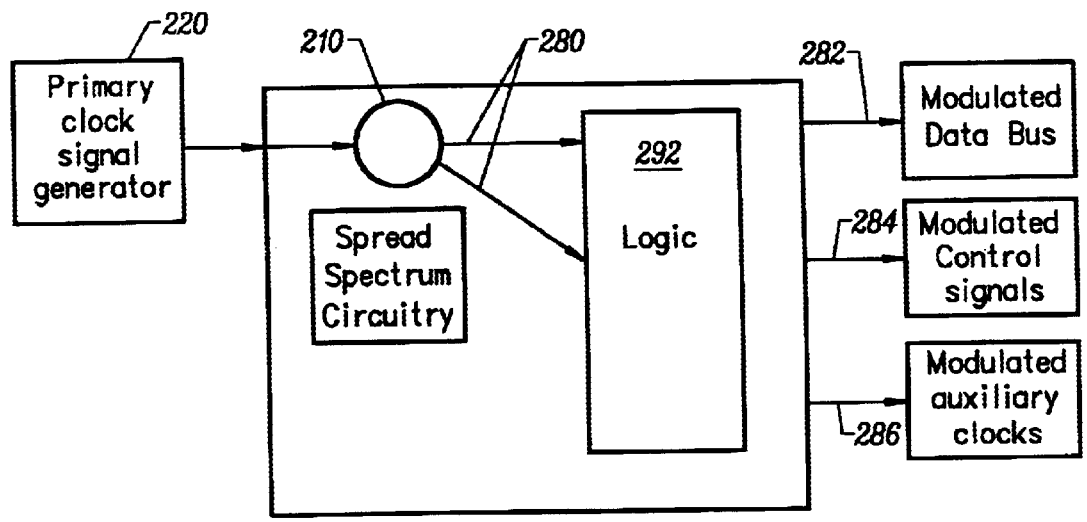
FIG. 6 is a diagram of a preferred embodiment of the spread spectrum circuit having two delay lines illustrated in FIG. 4, incorporated within a larger integrated circuit based device according to the invention.
Figure 6:
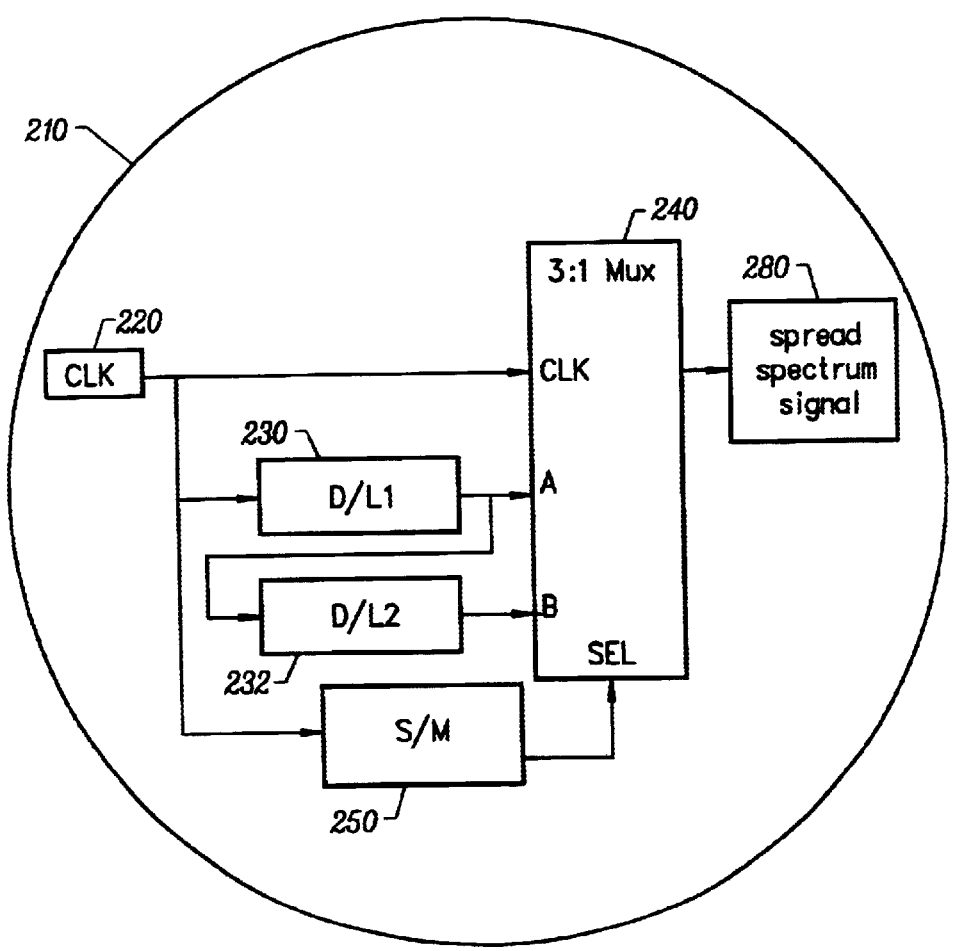

Referring to FIG. 6, an example of the above described preferred embodiment 210 of the spread spectrum system according to the invention is shown integrated within a larger digital device 290, such as a field programmable gate array (FGPA) or an application specific integrated circuit (ASIC). Given the ability of the spread spectrum 210 to use extremely small delay line technology, the spread spectrum circuit 210 can be incorporated on an FGPA, an ASIC or other digital device. As further shown in FIG. 6, the digital device 290 can include other logic 292, fixed or programmable, that can use the spread spectrum signal 280 within the digital device. For example, the spread spectrum signal 280 can be directed to provide a modulated data bus 282, modulated control signals, 284 or modulated auxiliary clocks 286. Consequently, the spread spectrum system 210 may be used to generate a plurality of different spread spectrum signals 280, 282, 284, 286 for use in controlling and synchronizing various elements of the microcircuit-based device. Additionally, such integration of the spread spectrum signal system 210 within a larger digital device or integrated circuit 290 allows more on-chip logic 292 to be used to further control the output of the state machine, thereby potentially increasing the number of available selection sequences to generate the spread spectrum output signal 280. Therefore, a primary clock signal 222 may be modified to create a plurality of different aggregate output signals 280 that uniquely adapt to the requirements of a particular digital device.

Hence, unlike PLL-based clock pulse signal modulation systems, where the modulated output signal is the result of the overlay of a particular waveform profile over the waveform generated by the clock, the invention can generate multiple output spread spectrum clock signals 280 from a single primary clock signal 222 to serve different purposes.

Figure 7:
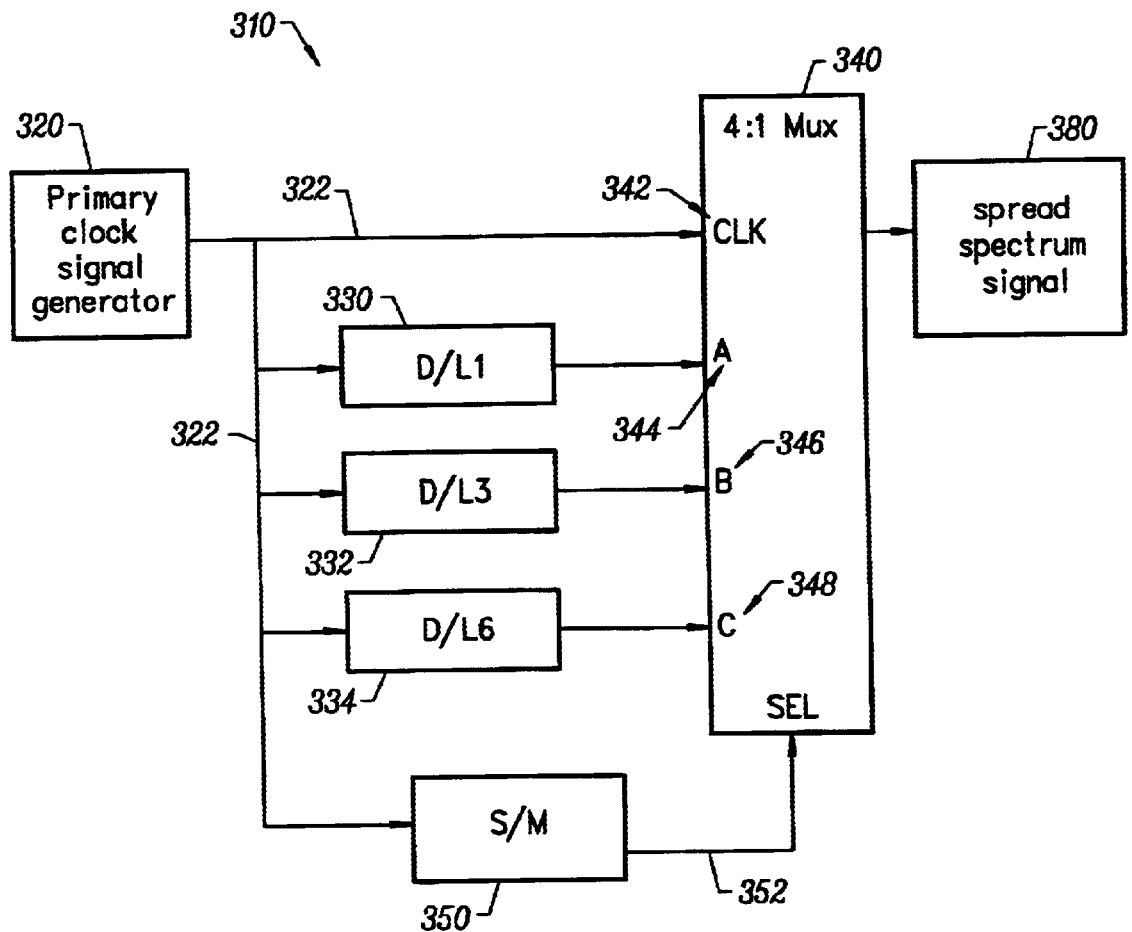
FIG. 7 is a block diagram of an alternative embodiment of the spread spectrum circuit having three delay lines according to the invention.

Referring now to FIG. 7, the spread spectrum system provides additional unique design advantages over and above the selection and aggregation of individual multiplexer inputs. For example, in an alternative embodiment 310, where multiple delay lines 330, 332, 334, having differing delay times D1, D3, D6, may be selected and multiplexed to create the modulated spread spectrum clock output signal 380, the different delay lines 330, 332, 334 are preferably selected as a suite of delays D1. In one scenario, the state machine 350 is programmed to generate control signals 352 which cause the 4 to 1 multiplexer 340 to select the inputs 342, 344, 346, 348 in a manner which allows a single individual inputs to be selected or multiple inputs to be selected simultaneously. A designer would be able to program logic so as to select delays where the number of different frequencies is maximized.

For example, the alternative embodiment 310 shown in FIG. 7 includes three delay lines inputs 330, 332, 334 and one original clock signal input 322 routed to the multiplexer 340. Where the original clock period is T, the first delay line 330 includes a delay time of D1=1, the second delay line 332 includes a delay time of D3 equal to three times D1 or 3 and the third delay line 334 includes a delay time of D6 equal to six times D1 or 6, the spread spectrum system 310 is able to generate the following discreet clock signal periods:

a) T;

b) T+1, T+2, T+3, T+5, T+6;

c) T−1, T−2, T−3, T−5, and T−6.

The varying periods result in the generation of an equivalent number of clock frequencies which may be reaggregated to create a desired spread spectrum signal 380. Hence, referring to FIG. 7, by incorporating three delay lines 330, 332, 334 and one clean original clock signal line 322 in the circuitry, a total of eleven different signal frequencies may be generated. These signals may then be aggregated by the multiplexer 340 to more uniformly spread the original clock signal 322 over a greater aggregate bandwidth. Increasing the number of available frequencies for reaggregation tends to reduce the spectral noise.

Corresponding, where four delay lines are included in spread spectrum system, providing a total of five different clock signal inputs to the multiplexer, a total of 5*5−6=19 frequencies may be generated. Similarly, where five delay lines are included in the spread spectrum system, providing a total of six different clock signal inputs made available to the multiplexer, 6*6−8=28 frequencies may be generated. By selecting the different delays as a suite in the following manner: T1=1, T2=1+2, T3=1+2+3 etc. . . ., the number of different frequencies is maximized. Consequently, there is no theoretical limit to the number of frequencies that may be generated by the spread spectrum system of the invention. The limit of the number of frequencies that may be generated is controlled only by the ability to incorporate a number of different delay lines and large multiplexers on board a microprocessor or other digital circuit.

Consequently, one skilled in the art would readily recognize that the implementation of the spread spectrum system may be adapted to provide more complex and differing spread spectrum signals as different technology is developed to reduce the size of delay lines, multiplexers, flip-flops and other elements of the spread spectrum system. Additionally, one skilled in the art will recognize that other algorithms may be incorporated in the logic of the spread spectrum system to generate outputted spread spectrum signals having different aggregate frequency profiles and amplitude. For example, modifying programmable logic used to control the operation of the multiplexer could provide for selecting delays in a differing suite or in a different order.

The delay lines need not be selected in sequence, starting with the original non-delayed clock signal. A first delay line may be selected by the multiplexer after the selection of the second delay line. As a result, as most clearly shown in discreet operation of the invention depicted in FIG. 5, the spread between signals can be modified and varied substantially. The greater the number of delay lines, the greater the number of available combinatorial overlays of the frequencies and the greater the number of available spacing between the individual and combined frequencies. Hence, the unique ability of the spread spectrum system 310 to generate a plethora of available signals allows the signals to be aggregated in a number of different ways to generate an even more complex spread spectrum signal 380.

Hence, a further benefit of the spread spectrum system of the invention is the ability to use one standard spread spectrum circuit configuration to generate a plurality of different spread spectrum signals. This advantage can reduce overall microcircuit-based device cost since standard spread spectrum circuit configurations could be used for many different applications.

Figure 8:
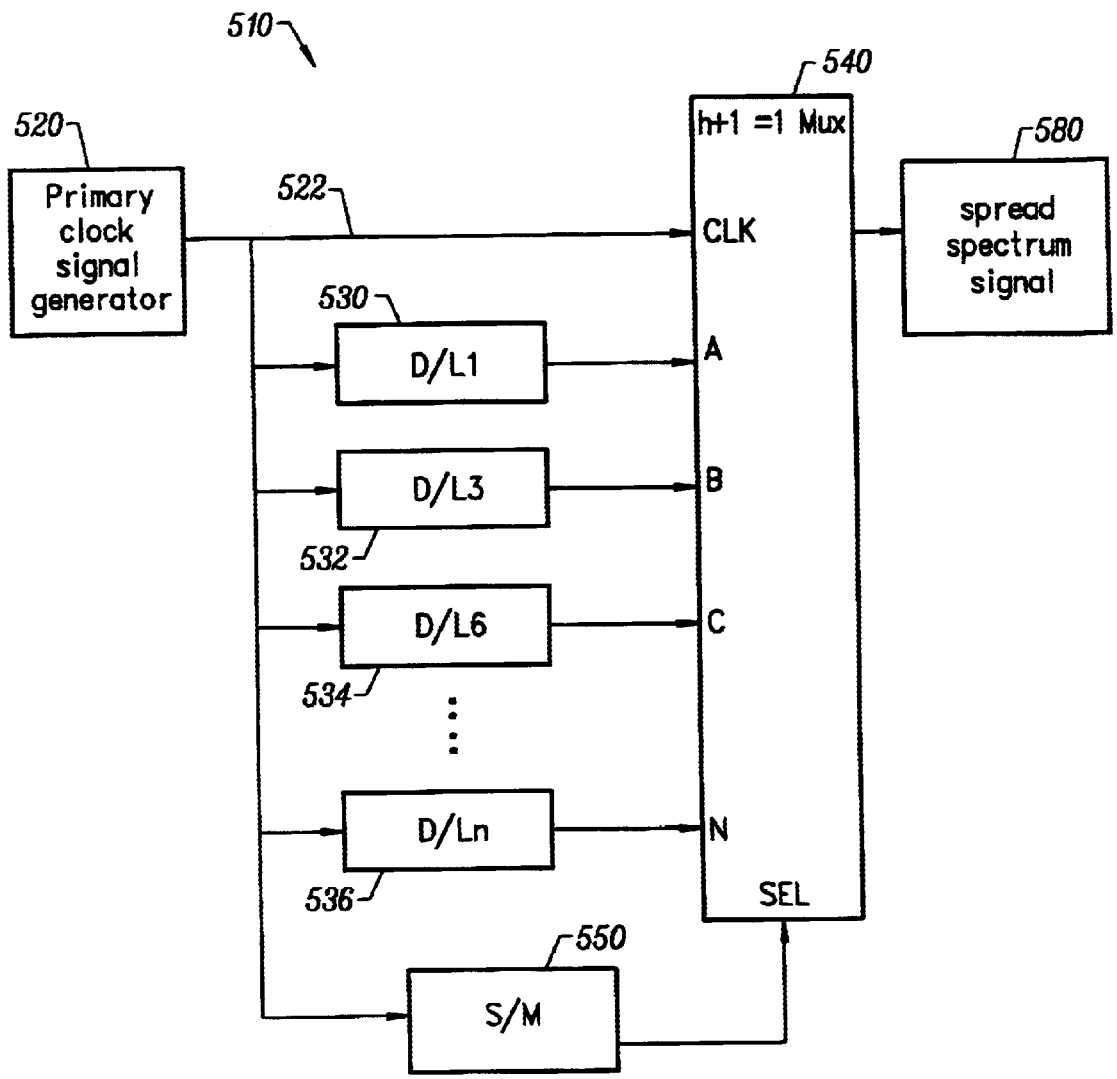
FIG. 8 is a block diagram of a generic embodiment of the spread spectrum circuit having n delay lines according to the invention.

As evidenced by the above descriptions and generically illustrated in FIG. 8, one skilled in the art will readily recognize that the spread spectrum system 510 according to the invention could be extended to include an infinite number, n, of delay lines 530, 532, 534, 536 providing n+1 selectable multiplexer inputs and resulting in a total output spread spectrum signal period of T+D1+D2 . . . Dn. In practice, the number and delay period D of delay lines are adjusted to accommodate the specific needs of a particular microcircuit. The number of delay lines could be extended until the original clock signal 522 is spread across a period of sufficient length that the nominal frequency is unintelligible or of insufficient energy to provide the desired synchronization for the system in which it is employed. One skilled in the art would also recognize that the spread spectrum system 510 could be implemented using any of a plurality of different multiplexers 540, state machines 550, and clock pulse generation means 520. The system and method of the present invention may be implemented using technology that is currently available, and, will accommodate future technology operating at much higher speeds.

Unlike existing spread spectrum modulators, the spread spectrum system 10 provides a unique ability to immediately respond to an input clock signal and create a desired output spread spectrum signal. Consequently the circuit of the invention uniquely lends itself to use in low power devices which may require rapid initialization and shutdown. Such devices might be used in high speed printers that require to enter lower power mode required in office environment. Hence, the spread spectrum system reduces device latency while still providing for compliance with EMI regulatory restrictions. Consequently, the EMI suppression system of the present invention might be used in a substantially greater number of high speed devices, thereby improving efficiency and response of the overall integrated system and providing for broader consumer use of high speed microcircuit-based devices.

The invention particularly and uniquely lends itself to uses where it is desirable to have the electronic device initialize and shutdown quickly and repeatedly. For example, high speed laser printers may be driven by video card components which are repeatedly turned on and off whenever a demand is placed on the printer to produce printed output. During this initialization period, a conventional PLL-based system would need to stabilize before being able to provide a desired clock signal to synchronize the operation of the printer. Hence, print response time is delayed. In addition, a conventional PLL-based spread spectrum signal modulation system might generate undesirable EMI during its stabilization period. The invention eliminates the need for the circuit to reach a stable state or ramp up. Once the first clock signal is generated, the spread spectrum system is able to generate a desired spread spectrum signal. Consequently, systems which use the present invention are able to respond more efficiently to changing operating conditions without exceeding EMI restrictions. Further, the invention eliminates the need to design for stray EMI generated during the startup period. The enhanced response time of the invention helps to improve overall system utility since one delay or bottleneck can be eliminated.

As would be readily understood by those skilled in the art, in an implementation of any of the circuits described herein in a physical package, such as a field programmable gate array (FGPA) or application specific integrated circuit (ASIC), several such spread spectrum circuits may be incorporated in the same physical package. The spread spectrum system may also be included internally with a microprocessor or any other digital circuit.

The above described circuit configurations support implementation of a method according to the invention for generating the spread spectrum clock output signal. The method of the invention preferably includes the steps of: generating a series of clock pulses, then digitally modulating those clock pulses by parsing individual clock pulses into a plurality of portions, sampling the portions, and then reaggregating the portions to create a spread spectrum clock pulse signal having a broader bandwidth and flatter signal amplitudes. The ability to reaggregate and customize the clock signal allows amplitude at harmonics of the fundamental clock frequency to be lowered, thereby minimizing generation of undesirable EMI spectral components which would otherwise be produced along with the series of primary clock pulses. The step of digitally spread spectrum modulating the series of clock pulses preferably includes the step of creating a digital spread spectrum simulation of each individual pulse by parsing, selecting, combining and reaggregating the clock pulses via the novel circuits of the various embodiments of the spread spectrum system, as described in greater detail above.

The method of the invention includes the step of providing a means for generating a series of clock pulses. The clock generation means may include a voltage controlled oscillator, a piezoelectric crystal or other such devices capable of generating a series of clock pulses.

A next step includes providing a means for delaying transmission of a clock pulse or a portion of a clock pulse. Such delay means includes a resistor-capacitor timing circuit, a delay line or other such devices capable of delaying the transmission of a clock signal through an electronic circuit.

A further step includes providing a means for selecting one of a plurality of clock signals, wherein the clock signals have varying delay times. Such selection means include NMOS switches driven by flip-flops, multiplexers controlled by the output of a state machine and other such devices capable of selecting one of a plurality of signals. Such selection means may also include the capability to combine one or more selected clock signals or portions thereof to create a new clock signal having the characteristics of the combined clock signals or portions thereof.

An additional step includes providing a means to control the sequence of selection and method of recombination of the selected clock signals or portions to provide an aggregate spread spectrum output clock signal pulse comprised of the components of the selected and combined clock signals.

This disclosure is provided to reveal a preferred embodiment of the invention and a best mode for practicing the invention. However, one skilled in the art will readily appreciate that other combinations of circuitry components may be substituted for those set forth herein without departing from the spirit and scope of the present invention. Further, additional advantages, applications and modifications of the invention will readily occur to those skilled in the art. Accordingly, the invention should only be limited by the claims included below.

What is claimed is:

1. A spread spectrum circuit for generating a clock output signal with reduced amplitude electromagnetic interference (EMI) spectral components, said spread spectrum circuit comprising:

a clock pulse generator for generating a primary clock signal having a fundamental frequency with a fundamental amplitude, wherein said primary clock signal is comprised of a series of clock pulses and wherein said clock pulses are composed of a plurality of spectral components at differing frequencies, said primary clock signal also having fundamental EMI spectral components at harmonics of said fundamental frequency, said fundamental EMI spectral components each having a fundamental amplitude;

a delay for delaying transmission of said primary clock signal;

a selector for selecting from a plurality of available clock signals;

a controller for driving said selector;

a combiner for combining a selected first clock signal with a selected second clock signal to generate an output clock signal having combined characteristics of said first clock signal and said second clock signal; and an aggregator cooperating with said selector and said combiner for generating a spread spectrum clock output signal having a nominal frequency substantially equivalent to said fundamental frequency of said primary clock signal, wherein said nominal frequency includes nominal EMI spectral components at harmonics of said nominal frequency, said nominal EMI spectral components each having a nominal amplitude, and wherein said nominal amplitude is less than said fundamental amplitude.

2. A spread spectrum circuit according to claim 1, wherein said clock pulse generator is selected from the group consisting of a voltage controlled oscillator and a piezoelectric crystal.

3. A spread spectrum circuit according to claim 1, wherein said delay is selected from the group consisting of a resistor-capacitor timing circuit and a delay line.

4. A spread spectrum circuit according to claim 1, wherein said selector comprises a multiplexer.

5. A spread spectrum circuit according to claim 1, wherein said controller comprises a state machine.

6. A spread spectrum circuit according to claim 1, wherein, said combiner comprises a multiplexer.

7. A spread spectrum circuit according to claim 1, wherein said aggregator comprises a multiplexer.

8. A spread spectrum circuit according to claim 1, wherein said selector, said combiner, and said aggregator are integrated within one digital device consisting of a multiplexer.

9. A spread spectrum system for generating a reduced amplitude clock pulse from an original primary clock pulse, said system comprising:

a clock signal generator for creating a series of clock pulses;

at least one non-delayed line, said non-delayed line receiving said series of clock pulses from said clock signal generator;

at least one delay line, said delay line having a delay time and causing a clock signal transmitted to said delay line to be outputted after passage of said delay time;

a multiplexer having at least one non-delay line input and at least one delay line input and at least one output, wherein said multiplexer receives output directly from said at least one non-delayed line and said at least one delay line; and a state machine that causes said multiplexer to repeatedly alternately select between said at least one non-delayed line and said at least one delayed line, thereby generating an output signal comprised of said clock pulses transmitted by said at least one non-delay line and said at least delay line.

10. The spread spectrum system of claim 9, wherein said state machine alternates between selection of said at least one non-delayed line and said at least one delay line at a frequency greater than the frequency of the generation of said clock pulses from said clock signal generator, thereby generating an output signal comprised of portions of said clock pulses transmitted by said at least one non-delay line and said at least one delay line.

11. The spread spectrum system of claim 10, wherein said state machine is programmable.

12. The spread spectrum system of claim 11, wherein said programmable state machine is able to vary the frequency and order of selection of said at least one non-delayed line and said at least one delay line.

13. A method for generating a clock output signal with reduced amplitude electromagnetic interference (EMI) spectral components, said method comprising:

providing a means to generate a series of clock pulses;

generating a series of clock pulses;

digitally modulating the clock pulses by spreading the energy of each clock pulse over a greater bandwidth;

generating a digitally-modulated clock output signal;

providing a means to delay transmittal of a clock pulse or a portion thereof;

providing a means to parse the clock pulse into portions;

providing a means to select from a plurality of delayed and non-delayed clock pulses or portions thereof;

providing a means to combine at least one clock pulse or portion thereof with one or more clock pulses or portions thereof;

providing a means to reaggregate the combined clock pulses or portions thereof;

parsing individual clock pulses into a plurality of portions;

selecting one or more of the clock pulses or portions thereof;

reaggregating the clock pulses or portions thereof;

creating a new series of spread spectrum clock pulses having a nominal frequency and nominal amplitude, wherein said nominal frequency is substantially similar to the fundamental frequency and the nominal amplitude is lower than the fundamental amplitude;

generating a spread spectrum clock signal; and, outputting the spread spectrum clock signal to other digital devices to control or synchronize the operation of the digital devices.

14. A method according to claim 13, wherein said reaggregating step is immediately preceded by:

combining the clock pulses or portions thereof, wherein new clock pulses or portions thereof having new frequency profiles that result from said combining step are created.

15. A method according to claim 13, wherein the clock generation means is selected from the group of piezoelectric crystal and a voltage controlled oscillator.

16. A method according to claim 15, wherein the delay means is selected from the group of resistor-capacitor timing circuit and a delay line.

17. A method according to claim 16, wherein the selection means is selected from the group of MOS switches driven by flip-flops and multiplexers driven by state machine.

* * * * *